(12) United States Patent
Sakai et al.

(10) Patent No.: US 8,189,447 B2
(45) Date of Patent: May 29, 2012

(54) OPTICAL DISC DRIVE AND METHOD OF CONTROLLING THE SAME

(75) Inventors: Hiroharu Sakai, Tokyo (JP); Hajime Nishimura, Tokyo (JP); Shuichi Minamiguchi, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 13/034,456

(22) Filed: Feb. 24, 2011

(65) Prior Publication Data

US 2011/0205871 A1 Aug. 25, 2011

(30) Foreign Application Priority Data

Feb. 24, 2010 (JP) ................................. 2010-038517

(51) Int. Cl.
*G11B 7/00* (2006.01)
(52) U.S. Cl. ........................................ 369/94; 369/44.26
(58) Field of Classification Search .................... 369/94, 369/44.27, 44.25, 44.26, 47.27, 53.1, 53.22
See application file for complete search history.

(56) References Cited

U.S. PATENT DOCUMENTS 7,248,541 B2 * 7/2007 Yonezawa .................. 369/30.12

2004/0076084 A1 4/2004 Yonezawa
2009/0080310 A1 3/2009 Ohhashi

FOREIGN PATENT DOCUMENTS

JP 2004-063025 2/2004
JP 2006-313591 11/2006

* cited by examiner

*Primary Examiner* — Nabil Hindi
(74) *Attorney, Agent, or Firm* — Antonelli, Terry, Stout & Kraus, LLP.

(57) ABSTRACT

An optical disc drive for reading or writing information on a multilayer optical disc having three or more recording layers by irradiating the disc with a light beam includes an optical pickup for irradiating the disc with the light beam, a recording state detector for detecting data recording states at a start point of a focus jump, a transit point or transit points on a recording layer or recording layers to be passed through, and an expected landing point of a focal point of the light beam in a focus jump, and a controller for moving the optical pickup to a position where the recording states are the same at all of the start point, the transit point(s) on the recording layer(s) to be passed through, and the expected landing point if the recording states are different among those points, before starting the focus jump.

6 Claims, 7 Drawing Sheets

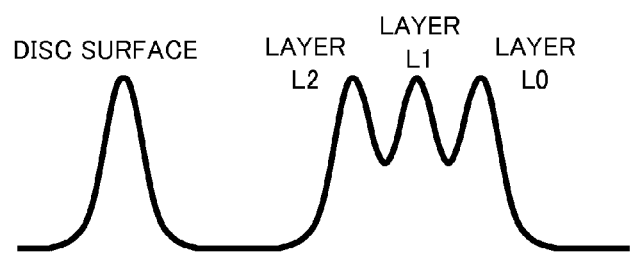
*FIG. 2A*
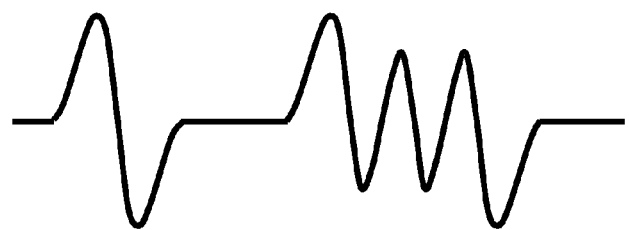
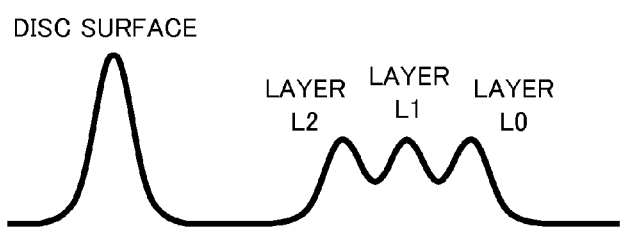
*FIG. 2B*
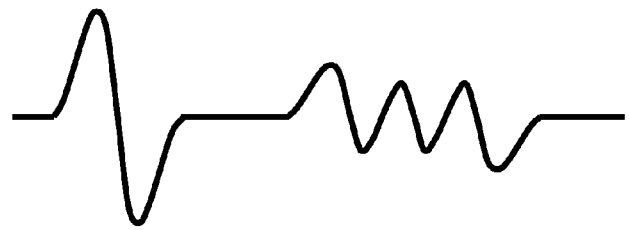
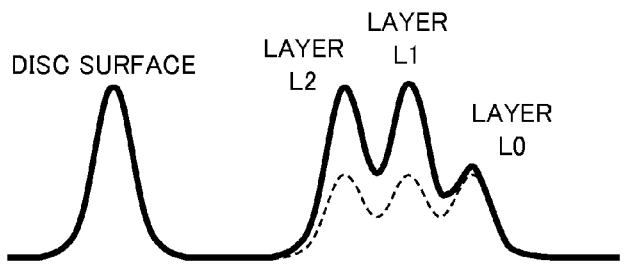
*FIG. 2C*
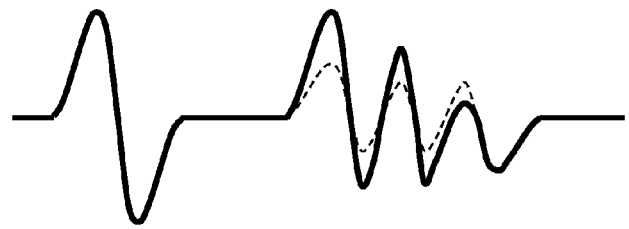

OPTICAL DISC DRIVE AND METHOD OF CONTROLLING THE SAME

CLAIM OF PRIORITY

The present application claims priority from Japanese patent application JP 2010-38517 filed on Feb. 24, 2010, the content of which is hereby incorporated by reference into this application.

BACKGROUND OF THE INVENTION

This invention relates to an optical disc drive and, in particular, relates to a focus control technique in irradiating a multilayer optical disc having a plurality of recording layers with a light beam to read or write information therein.

An optical disc drive that reads or writes information in an optical disc such as CD (Compact Disc), DVD (Digital Versatile Disc), and BD (Blu-ray Disc) spins an optical disc at high speed, irradiates an information recording surface of the spinning optical disc with laser light, and detects the reflection of the laser light to read or write information.

Regarding a focus jump control to move the focal point of a light beam to a different recording layer, JP2004-63025A discloses a technique to detect the distribution of recorded areas and unrecorded areas on an optical disc and control the focus jump so that the focus landing point will not be in an unrecorded area.

SUMMARY OF THE INVENTION

In conventional techniques, only optical discs having two recording layers are considered and optical discs having three or more recording layers are not considered. To perform a focus jump across one or more recording layers, if the recording states are different among a focus jump start layer, one or more transit layers, which are the layers to be passed through, and a focus jump target layer, it may be difficult to perform a stable focus jump since a reflection signal of a laser beam is not stable.

This invention has been made in view of the above-described problem and an object of this invention is to provide a technique to perform a stable focus jump across one or more recording layers.

A representative aspect of this invention is as follows. That is, there is provided an optical disc drive for reading or writing information on a multilayer optical disc having three or more recording layers by irradiating the multilayer optical disc with a light beam, comprising: an optical pickup for irradiating the multilayer optical disc with the light beam, a recording state detector for detecting data recording states at a start point of a focus jump, a transit point or transit points on a recording layer or recording layers to be passed through, and an expected landing point of a focal point of the light beam in a focus jump to move the focal point of the light beam across one or more recording layers to a target recording layer, and a controller for moving the optical pickup to a position where the recording states are the same at all of the start point of the focus jump, the transit point or transit points on the recording layer or recording layers to be passed through, and the expected landing point of the focal point of the light beam if the recording states are different among the start point of the focus jump, the transit point or transit points on the recording layer or recording layers to be passed through, and the expected landing point of the focal point of the light beam, before starting the focus jump.

Another representative aspect of this invention is as follows. That is, there is provided a method of controlling an optical disc drive for reading or writing information on a multilayer optical disc having three or more recording layers by irradiating the multilayer optical disc with a light beam, comprising the steps of detecting data recording states at a start point of a focus jump, a transit point or transit points on a recording layer or recording layers to be passed through, and an expected landing point of a focal point of the light beam in a focus jump to move the focal point of the light beam across one or more recording layers to a target recording layer, and moving the optical pickup to a position where the recording states are the same at all of the start point of the focus jump, the transit point or transit points on the recording layer or recording layers to be passed through, and the expected landing point of the focal point of the light beam if the recording states are different among the start point of the focus jump, the transit point or transit points on the recording layer or recording layers to be passed through, and the expected landing point of the focal point of the light beam, before starting the focus jump.

According to a representative embodiment of this invention, a stable focus jump across one or more recording layers can be achieved.

BRIEF DESCRIPTION OF THE DRAWINGS

The present invention can be appreciated by the description which follows in conjunction with the following figures, wherein:

FIG. 2A to FIG. 2C are diagrams schematically illustrating examples of sum signals (RF signals) and focus error signals (FE signals) during focus jump operations by a conventional optical disc drive;

DETAILED DESCRIPTION OF THE EMBODIMENTS

Hereinafter, preferred embodiments will be explained with reference to the accompanying drawings.

First Embodiment

Figure 1:
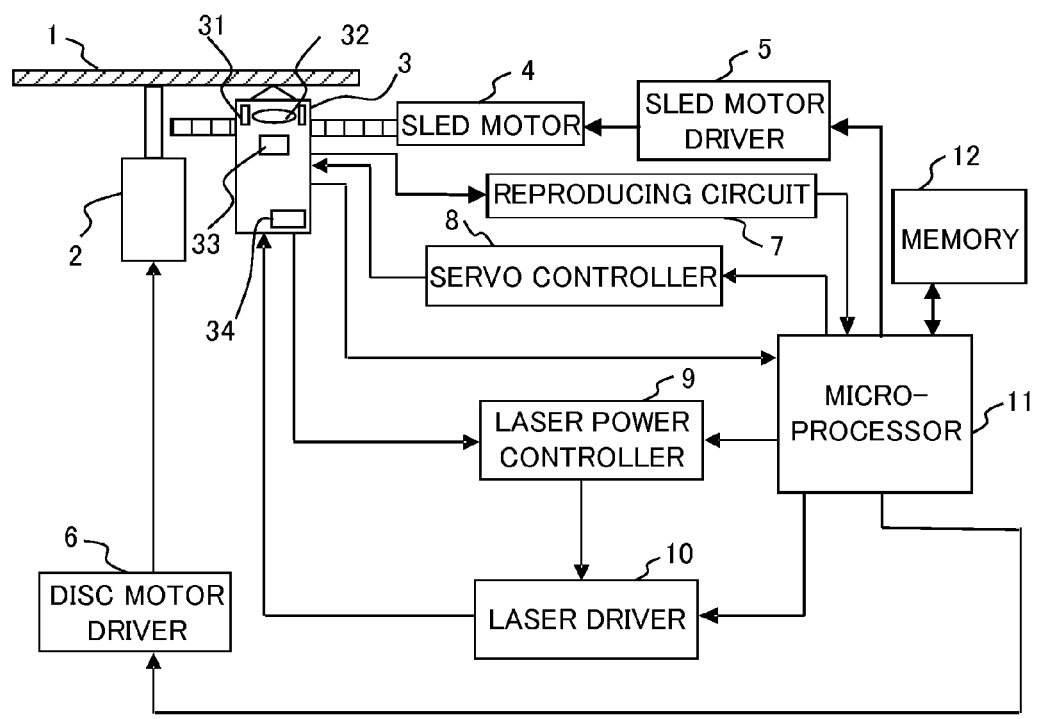
FIG. 1 is a block diagram illustrating a configuration of an optical disc drive in a first embodiment.

FIG. 1 is a block diagram illustrating a configuration of an optical disc drive in a first embodiment. The optical disc drive in the first embodiment comprises a disc motor 2, an optical pickup 3, a sled motor 4, a sled motor driver 5, a disc motor driver 6, a reproducing circuit 7, a servo controller 8, a laser power controller 9, a laser driver 10, a microprocessor 11, and a memory 12.

The disc motor 2 is driven by the disc motor driver 6 to rotate an optical disc 1. The optical disc 1 is a multilayer optical disc having three or more recording layers, for example, a BD, although not limited to a BD. The disc motor driver 6 controls the rotation (rotating/stopping, and the rotation speed) of the disc motor 2 in response to instructions of the microprocessor 11.

The optical pickup 3 includes an actuator 31, an object lens 32, a laser 33, a front monitor 34, and further, an optical receiver and a beam splitter not shown. The laser 33 is a semiconductor laser (light emitter) for emitting laser light of a predetermined intensity for reading or writing. The laser light emitted from the laser 33 impinges on the recording surface (optical disc surface) of the optical disc 1 through the object lens 32. The optical receiver receives the laser light reflected on the recording surface of the optical disc 1, converts the received reflection into an electrical signal, and outputs the converted electrical signal. The object lens 32 is driven and adjusted by the actuator 31 to focus the laser light on the surface of the optical disc. The actuator 31 is driven by the servo controller 8.

The laser light emitted by the laser 33 is split by the beam splitter, for example, and is led to the front monitor 34. The front monitor 34 monitors the power of the laser light based upon the split laser light.

The reproducing circuit 7 reproduces data (information) based on the electrical signal output by the optical pickup 3 and also generates a tracking error signal and a focus error signal. The tracking error signal is to indicate displacement of laser light from a track on the optical disc 1 and the focus error signal is to indicate displacement of the focal point of laser light from a recording surface (recording layer) of the optical disc 1.

The servo controller 8 controls focus servo and tracking servo. The focus servo controls the object lens 32 to focus laser light on the recording surface of the optical disc 1 by driving the actuator 31. The tracking servo controls the optical pickup 3 to follow a track of the optical disc 1.

The laser power controller 9 controls the output power of laser light in accordance with a laser power preliminarily recorded in the optical disc 1 or determined by OPC (Optimum Power Control). The laser power controller 9 also controls laser light in accordance with a laser power predetermined for reading. The laser driver 10 is a drive circuit for driving the laser 33. The laser driver 10 is controlled by the laser power controller 9.

The microprocessor 11 controls operations of the optical disc drive. For example, it instructs the servo controller 8 to control a focus jump. The memory 12 stores a program to be executed by the microprocessor 11 and data necessary to execute the program.

FIG. 2A to FIG. 2C are diagrams schematically illustrating examples of sum signals (RF signals) and focus error signals (FE signals) generated by the reproducing circuit 7 during focus jump operations by a conventional optical disc drive. In these examples, the optical disc 1 has three recording layers: the deepest layer from the surface of the optical disc on the recording plane side called layer L0, the layer one above the layer L0 called layer L1, and the layer closest to the disc surface called layer L2. It should be noted that this invention is not limited by such nominal designations of recording layers.

In each of FIG. 2A to FIG. 2C, the upper signal is the sum signal (RF signal) and the lower signal is the focus error signal (FE signal). The parts where the waveforms of the sum signal and the focus error signal show abrupt changes correspond to, in order from the leftmost, the reflections from the disc surface, the layer L2, the layer L1, and the layer L0.

FIG. 2A shows the signals when all the three recording layers have no data recorded. FIG. 2B shows the signals when all the three layers have data recorded. As seen from the comparison of FIG. 2A with FIG. 2B, the values of the sum signal and the focus error signal in the case of data recorded are smaller than the signal values in the case of no data recorded.

FIG. 2C shows the signals when only the layer L0 has data recorded and the layers L1 and L2 have no data recorded. In other words, recording layers with data recorded and without data recorded are mixed. In this case, the sum signal corresponding to the layer L0 shows greater values than in the case where all of the recording layers have been recorded (FIG. 2B), as being affected by the signal on the adjacent layer L1 without data recorded. In FIG. 2C, the dashed lines indicate the values of the signals in the case where all of the recording layers have been recorded. The focus error signal corresponding to the layer L0 shows smaller values on the side closer to the layer L1 than in the case where all the recording layers have been recorded (FIG. 2B).

That is to say, in a focus jump, if the data recording states are the same at all of the focus jump start point, the transit point on the transit layer, and the focus landing point, the amplitude values of the sum signal and the focus error signal are within certain ranges and stable as shown in FIG. 2A and FIG. 2B. On the other hand, if the data recording states are different among the focus jump start point, the transit point on the transit layer, and the focus landing point, the signals are unstable as being affected by the signals on an adjacent layer different in the data recording state. In particular, compared with the case where the distance between recording layers adjacent to one another is larger, the smaller the distance between recording layers adjacent to one another, the larger the effect from an adjacent layer.

In FIG. 2C, only the layer L0 has data recorded and the layers L1 and L2 have no data recorded to exemplify the case where the data recording states are different among the recording layers, but this is not limited to the example of FIG. 2C.

Figure 3:
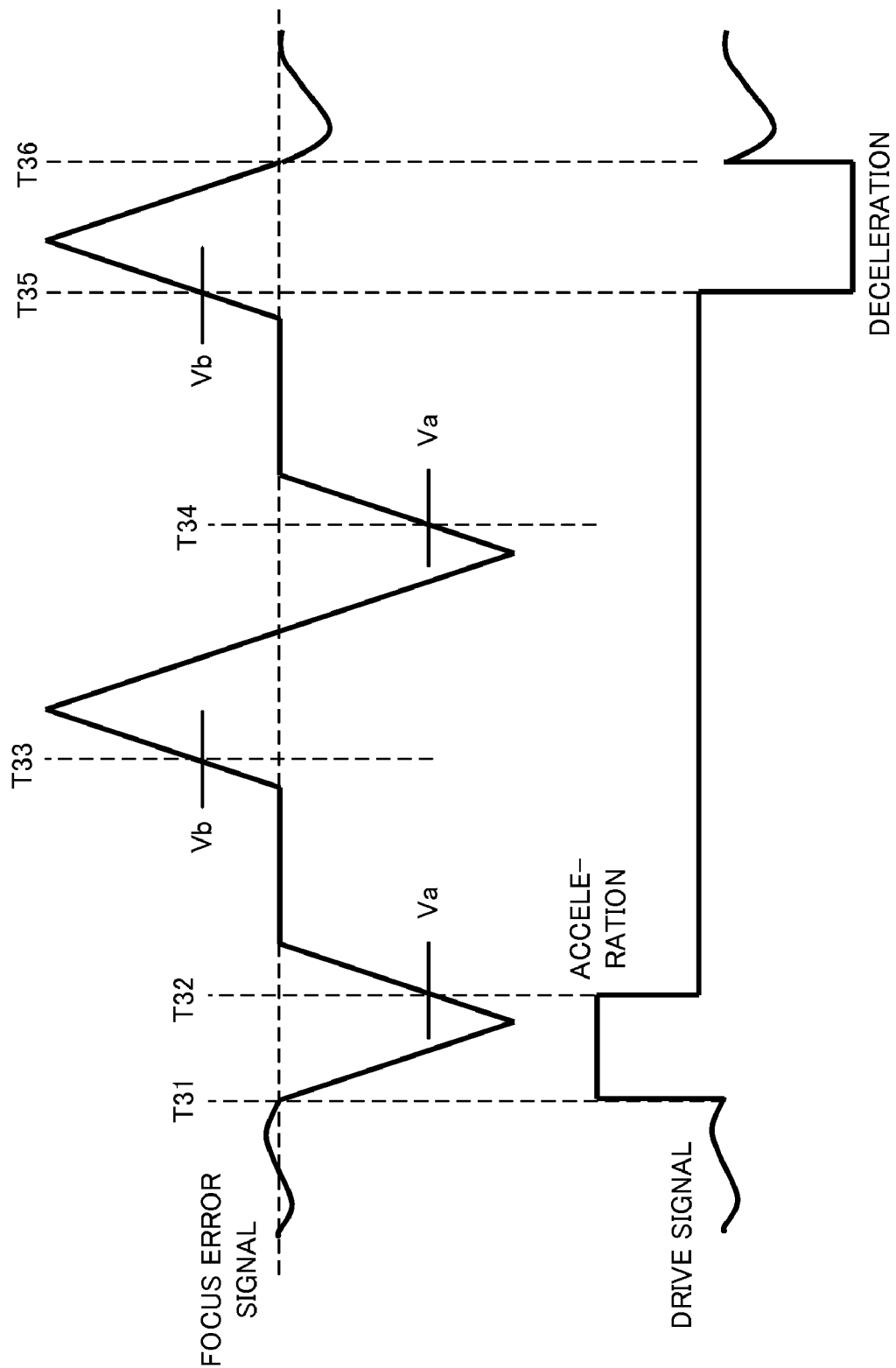
FIG. 3 shows a focus error signal and a drive signal at a focus jump from a layer L2 to a layer L0.

Now, control in a focus jump will be outlined. FIG. 3 shows a focus error signal and a drive signal at a focus jump from the layer L2 to the layer L0.

In FIG. 3, a threshold Va is to determine the timing to stop outputting an acceleration signal (to be described later) and is called acceleration stop threshold. This acceleration stop threshold Va also works as a threshold for recording layer transit determination to determine whether the focal point has passed through a recording layer or not during a focus jump. The threshold for recording layer transit determination may be set at a value different from the acceleration stop threshold.

A threshold Vb is to determine the timing to start outputting a deceleration signal and is called deceleration start threshold. This deceleration start threshold Vb also works as a threshold for recording layer detection to determine detection of a recording layer during a focus jump. The threshold for recording layer detection may be set at a value different from the deceleration start threshold.

Upon receipt of an inter-layer jump command, the microprocessor 11 outputs an acceleration signal to move the object lens 32 closer to the optical disc 1 (time T31). The object lens 32 moves toward the optical disc 1 in accordance with the acceleration signal, so that the focus error signal turns to the negative side.

Thereafter, the microprocessor 11 detects a negative peak of the focus error signal, and when the focus error signal has exceeded the acceleration stop threshold Va, the microprocessor 11 stops outputting the acceleration signal (time T32). As described above, the acceleration stop threshold Va also works as the threshold for recording layer transit determination. Accordingly, when the value of the focus error signal has exceeded the threshold Va for recording layer transit determination, the microprocessor 11 determines that the focal point has passed through the layer L2.

After the output of the acceleration signal is stopped, the object lens 32 continues to move because of inertia, so that the focus error signal turns to the positive side. When the focus error signal has exceeded the threshold Vb for recording layer detection, it determines that the focal point has entered the layer L1 (time T33). After that, the microprocessor 11 detects a positive peak and another negative peak of the focus error signal, and when the value of the focus error signal has exceeded the threshold Va for recording layer transit determination again, it determines that the focal point has passed through the layer L1 (time T34).

When the focus error signal has exceeded the threshold Vb for recording layer detection, the microprocessor 11 determines that the focal point has entered the layer L0 (time T35). As described above, the threshold Vb for recording layer detection also works as the deceleration start threshold. Namely, when the focus error signal has exceeded the deceleration start threshold Vb, the microprocessor 11 starts outputting a deceleration signal to stop the object lens 32 (time T35). When the value of the focus error signal becomes zero, it stops outputting the deceleration signal to turn on a focus servo (time T36). Through this series of operations, the optical disc drive moves the focal point of laser light from the layer L2 to the layer L0.

As shown in FIG. 2A and FIG. 2B, the focus error signal shows different values between when a recording layer has data recorded and when a recording layer has no data recorded. Accordingly, the threshold Va should be set at a value that enables determination of passing through a recording layer regardless of whether data is recorded or not. Similarly, the threshold Vb should be set at a value that enables detection of a recording layer regardless of whether data is recorded or not.

However, if the optical disc has areas with data recorded and areas without data recorded together as shown in FIG. 2C, the focus error signal changes in level during a focus jump. In the example of FIG. 2C, the values of the focus error signal corresponding to the layer L0 are smaller on the side closer to the layer L1 than those when all the recording layer have data recorded (FIG. 2B).

Accordingly, the optical disc drive in the first embodiment performs a focus jump at a position where the focus jump start point, the transit point on the transit layer, and the focus landing point have the same data recording state. The same data recording state means that all the recording layers have data recorded or that all the recording layers have no data recorded.

Figure 4:
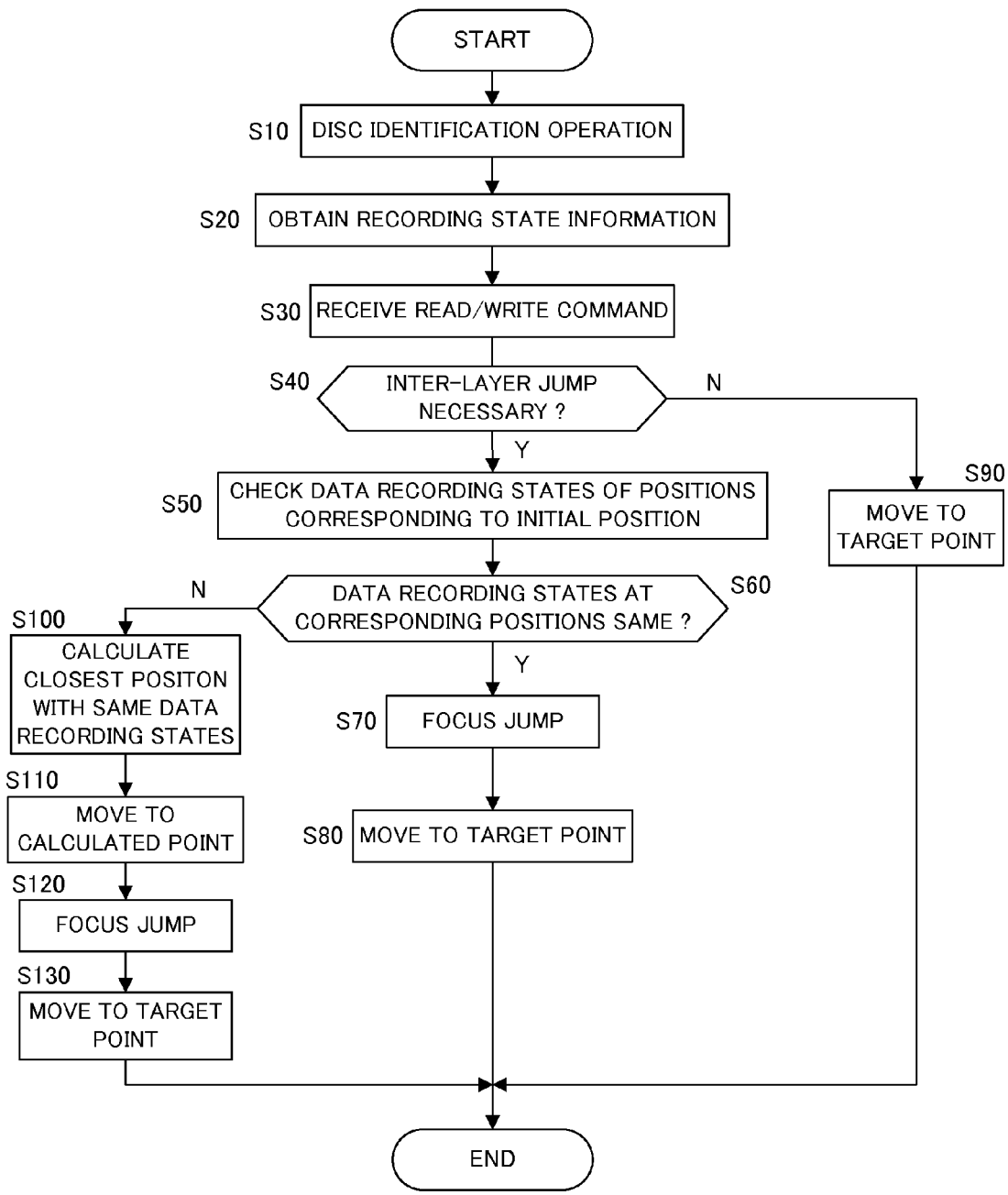
FIG. 4 is a flowchart illustrating a procedure to be executed by the optical disc drive in the first embodiment.

FIG. 4 is a flowchart illustrating a procedure to be executed by the optical disc drive in the first embodiment. Upon loading of the optical disc 1, the optical disc drive starts the process of step S10.

After performing a predetermined disc identification operation at the step S10, the optical disc drive obtains information on the recording state of each data area at step S20. The information on the recording state of each data area includes at least information indicating whether the data area has data recorded or no data recorded. For example, if the disc is a BD, the information on the recording state of each data area can be obtained from SRRI (Sequential Recording Range Information), which is a kind of information included in a disc management area provided in the inner diameter or the outer diameter of the optical disc 1. For example, if the disc includes recorded data, the SRRI includes one or more pieces of positional information (addresses) each indicating the start and the end of an area with data recorded. Accordingly, the optical disc drive can obtain positional information on the start and the end of each recorded area to know the recording state of each data area.

When the optical disc drive receives a data read command or a data write command at step S30, the procedure proceeds to step S40. At the step S40, the optical disc drive determines whether an inter-layer jump, or a shift to another recording layer, is necessary or not to move the focal point of laser light to the access target address. If it determines that an inter-layer jump is unnecessary, the procedure proceeds to step S90. At the step S90, the optical disc drive controls the focal point of laser light to move to the target point on the same recording layer.

On the other hand, if the optical disc drive determines that an inter-layer jump is necessary at the step S40, the procedure proceeds to step S50. At the step S50, the optical disc drive checks the data recording states at the focus jump start point, the transit point(s) on the transit layer(s), and the focus landing point corresponding to the initial position of the focal point of laser light with reference to the information obtained at the step S20.

Figure 5:
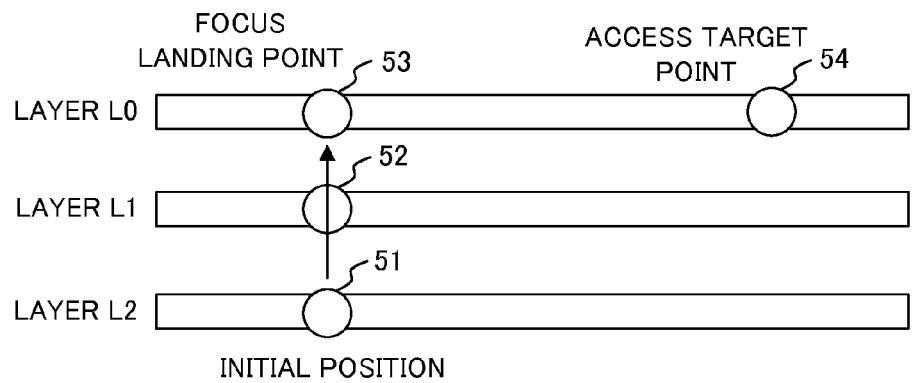
FIG. 5 is a diagram illustrating a focus jump start point, a transit point on a transit layer, and a focus landing point corresponding to an initial position of a focus point in a focus jump from the layer L2 to the layer L0.

FIG. 5 is a diagram illustrating a focus jump start point 51, a transit point 52 on a transit layer, and a focus landing point 53 corresponding to the initial position 51 of a focal point in a focus jump from the layer L2 to the layer L0. The initial focus point 51 is on the layer L2 and the access target point 54 is on the layer L0. The layer L1 is a transit layer. The optical disc drive calculates the radius in the vicinity of the initial focus point 51 from the address information read from the optical disc 1 by the reproducing circuit 7 in the vicinity of the initial focus point (focus jump start point) 51, and obtains the addresses of the transit point 52 on the transit layer and the focus landing point 53 by calculation based on the obtained radius. The optical disc drive refers to the information on the recording state of each data area obtained at the step S20 based on the obtained addresses to check the data recording states of the focus jump start point, the transit point on the transit layer, and the focus landing point corresponding to the initial position of the focal point.

At step S60, the optical disc drive determines whether the data recording states of the focus jump start point, the transit point(s) on the transit layer(s), and the focus landing point checked at the step S50 are the same or not. If the data recording states are the same at all of the focus jump start point, the transit point(s) on the transit layer(s), and the focus landing point corresponding to the initial position of the focal point, namely, data have been recorded at all the points or unrecorded at all the points, the procedure proceeds to step S70.

At the step S70, a focus jump is performed at the initial focus point since the data recording states are the same at all of the focus jump start point, the transit point(s) on the transit layer(s), and the focus landing point. At the next step S80, the optical disc drive moves the optical pickup 3 to move the focal point of laser light from the focus landing point to the target point.

On the other hand, if the optical disc drive determines that the data recording states of the focus jump start point, the transit point(s) on the transit layer(s), and the focus landing point are not the same at the step S60, the procedure proceeds to step S100. At the step S100, the optical disc drive calculates the closest point from the initial position in the radial directions where the data recording states of the focus jump start point, the transit point(s) on the transit layer(s), and the focus landing point are the same.

Figure 6:
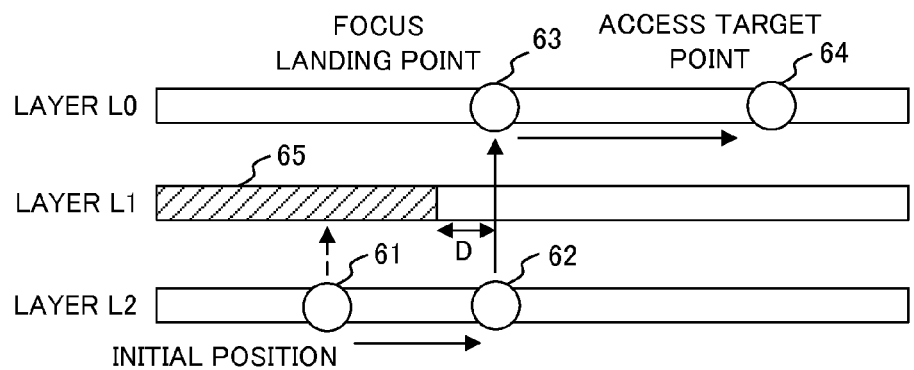
FIG. 6 is a diagram for illustrating a focus jump control when the initial focus point has no data recorded and the transit point on the transit layer (the layer L1) corresponding to the initial focus point has data recorded.

FIG. 6 is a diagram for illustrating a focus jump control when the initial focus point 61 has no data recorded and the transit point on the transit layer (the layer L1) corresponding to the initial focus point 61 has data recorded. In FIG. 6, a hatched area 65 is an area with data recorded and the other areas are areas without data recorded. The initial focus point 61 is on the layer L2 and the access target point 64 is on the layer L0.

In this situation, the optical disc drive calculates the closest point from the initial position 61 where the data recording states of the focus jump start point, the transit point on the transit layer, and the focus landing point are the same. In this example, a position 62 where the data recording states of the focus jump start point, the transit point on the transit layer, and the focus landing point are the same and which is located at a predetermined distance D away from the boundary between the area with data recorded and the area without data recorded is determined as the point closest from the initial position 61. The distance D is determined in advance based on the amount of unique displacement in address for each recording layer, the amount of biased center unique to the optical disc 1, the amount of biased center generated in mounting the disc motor 2, and the like. For example, a little margin is added to the amount of unique displacement in address for each recording layer to determine the distance D.

At step S110, the optical disc drive moves the optical pickup 3 to move the focal point of laser light to the point calculated at the step S100.

At step S120, it performs a focus jump based on the point where the focal point of laser light has been moved. Through these operations, a stable focus jump is achieved at a point where the data recording states are the same at all of the focus jump start point, the transit point(s) on the transit layer(s), and the focus landing point. At the next step S130, the optical disc drive moves the optical pickup 3 to move the focal point of laser light from the focus landing point to the target point.

In a focus jump across one or more recording layers, the optical disc drive in the first embodiment detects the recording states at the start point of the focus jump, the transition point(s) on the transit layer(s), and the expected landing point of the focal point of a light beam, and if the recording states at these points are different, it moves the optical pickup to a position where all the data recording states are the same before starting the focus jump. Through these operations, the focus error signal becomes stable so that a stable focus jump can be performed.

In particular, if the recording states are different among the start point of the focus jump, the transition point(s) on the transit layer(s), and the expected landing point of the focal point of a light beam, the optical disc drive moves the optical disc to a position where the data recording states at those points are the same and which is located at a predetermined distance D away from the boundary between an area with data recorded and an area without data recorded, before starting a focus jump. Consequently, the optical disc drive can perform a stable focus jump at a position where a stable focus error signal can be obtained.

The optical disc drive determines the distance D based on the amount of displacement in address determined for each recording layer, the amount of biased center unique to the optical disc 1, the amount of biased center generated in mounting the disc motor 2, and the like, so that it achieves a focus jump at a position where the recording states are definitely the same at all of the start point of the focus jump, the transition point(s) on the transit layer(s), and the expected landing point of the focal point of a light beam. If the recording states are different among those points, the distance to move the optical pickup can be minimized, so that the time for the focal point of laser light to reach a target point can be minimized.

Second Embodiment

The optical disc drive in the first embodiment performs a focus jump at a position where the data recording states are the same at all of the focus start point, the transit point(s) on the transit layer(s), and the focus landing point. In this regard, if any of the focus start point, the transit point(s) on the transit layer(s), and the focus landing point is around a border between an area with data recorded and an area without data recorded, the data recording states at these points might be different so that a stable focus jump cannot be achieved.

Accordingly, if any of the focus start point, the transit point(s) on the transit layer(s), and the focus landing point is around a border between an area with data recorded and an area with no data recorded, an optical disc drive in a second embodiment performs the focus jump avoiding the border. In this description, an area within a predetermined distance D from the boundary between an area with data recorded and an area without data recorded is defined as "around border". The distance D is determined in advance by the method explained in the first embodiment. It should be noted that the configuration of the optical disc drive in the second embodiment is the same as that of the optical disc drive in the first embodiment shown in FIG. 1.

Figure 7:
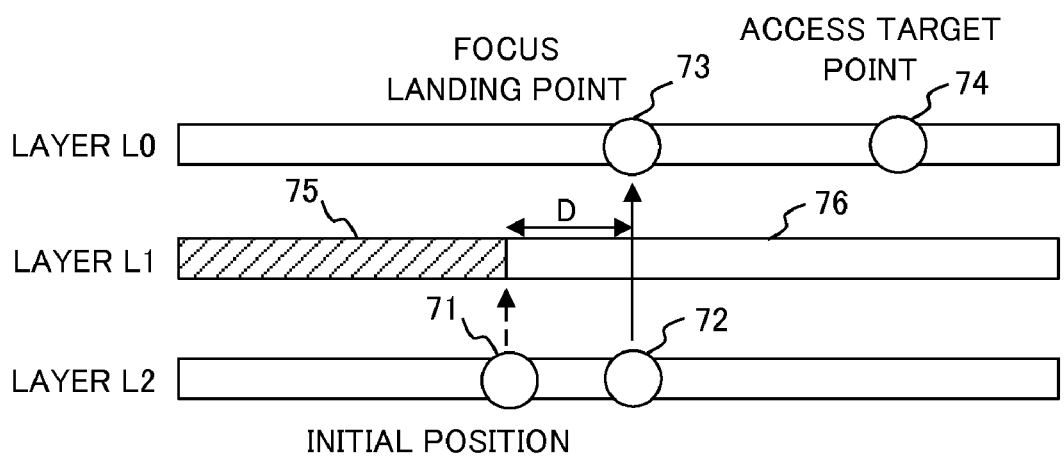
FIG. 7 is a diagram for illustrating a method of a focus jump in the case where a transit point on a transit layer is around a border between an area with data recorded and an area without data recorded.

FIG. 7 is a diagram for illustrating a method of a focus jump in the case where a transit point on a transit layer is around a border between an area with data recorded and an area without data recorded. In FIG. 7, a hatched area 75 is an area with data recorded and the other areas are areas without data recorded. The current position 71 of the focal point of a light beam is on the layer L2 and the focus target point 74 is on the layer L0.

As shown in FIG. 7, if the optical disc drive performs a focus jump from the current position 71 of the focal point of an optical beam, the expected transit point on the transit layer will be around the border between an area 75 with data recorded and an area 76 without data recorded. Accordingly, the optical disc drive first moves the focal point of the optical beam to the closest point 72 where none of the focus jump start point, the transit point on the transit layer, and the focus landing point is around a border between an area with data recorded and an area without data recorded and all the data recording states at these points are the same. The closest point should be, like in the first embodiment, a position where the data recording states are the same at all of the focus jump start point, the transit point on the transit layer, and the focus landing point and which is located at the predetermined distance D away from the boundary between an area with data recorded and an area without data recorded.

Thereafter, the optical disc drive performs a focus jump from the point 72 where the focal point of a light beam has been moved and moves the focal point of the light beam from the focus landing pint 73 to the focus target point 74.

Figure 8:
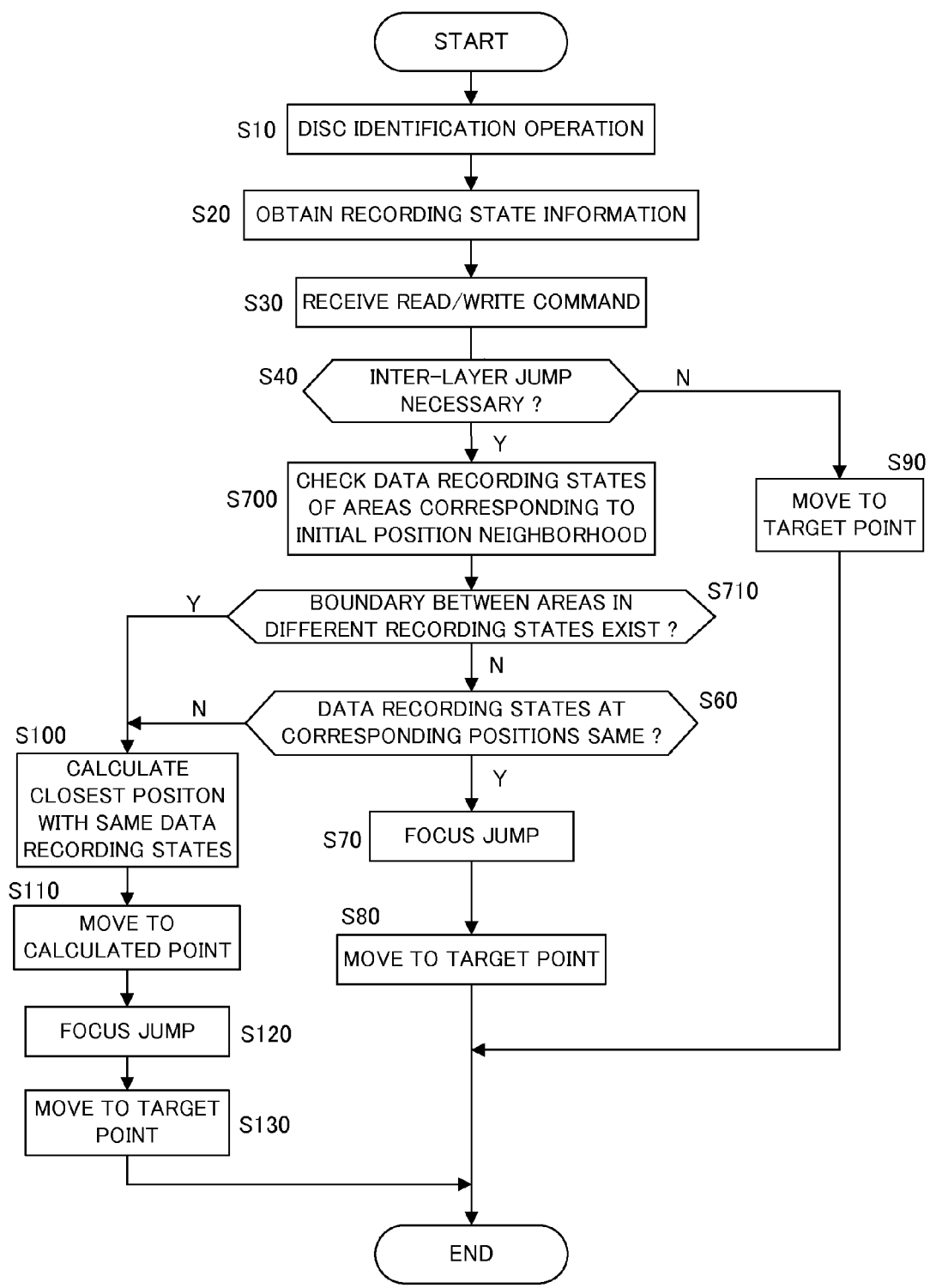
FIG. 8 is a flowchart of a procedure to be performed by an optical disc drive in a second embodiment.

FIG. 8 is a flowchart of a procedure to be performed by the optical disc drive in the second embodiment. The steps where the same operations are performed as those in FIG. 4 are denoted by the same reference signs and detailed descriptions are omitted at this stage.

At step S700, the optical disc drive checks data recording states in the areas within the predetermined distance D from the focus jump start point, the transit point(s) on the transit layer(s), and the focus landing point corresponding to the initial focus point.

At step S710, the optical disc drive determines whether any of the focus jump start point, the transit point(s) on the transit layer(s), and the focus landing point corresponding to the initial focus point is around a border between an area with data recorded and an area without data recorded based on the result of the check at the step S700. Specifically, it refers to the information on recording states of areas checked at the step S20 to determine whether there is a boundary between an area with data recorded and an area without data recorded in the areas within the predetermined distance D from the focus jump start point, the transit point(s) on the transit layer(s), and the focus landing point corresponding to the initial focus point. If it determines that there is a boundary between an area with data recorded and an area without data recorded, the procedure proceeds to step S100. If it determines that there is not, the procedure proceeds to step S60. The operations from the steps S60 to S80 and from the steps S100 to S130 are the same as those in the flowchart shown in FIG. 4.

If at least any one of the focus jump start point, the transit point(s) on the transit layer(s), and the focus landing point is in a predetermined area from a boundary between an area with data recorded and an area without data recorded, the optical disc drive in the second embodiment moves the optical pickup to a position which is located outside the predetermined area from the boundary and where the recording states are the same at all of the start point of a focus jump, the transit point(s) on the transit layer(s), and the focus landing point, before starting a focus jump. Through this operation, a stable focus jump is achieved, avoiding a boundary between an area with data recorded and an area without data recorded.

As set forth above, preferred embodiments of this invention have been described in detail with reference to the accompanying drawings; however, specific configurations are not limited to these embodiments but may include various designs within the scope of this invention. For example, the embodiments have been described assuming that the optical disc 1 has a characteristic that the values of the sum signal and the focus error signal corresponding to a recording layer with data recorded are lower than those corresponding to a recording layer without data recorded. However, this invention can be applied to an optical disc that has a characteristic that the values of the sum signal and the focus error signal corresponding to a recording layer without data recorded are lower than those corresponding to a recording layer with data recorded.

The optical disc drive in the first embodiment performs a focus jump at a position where data recording states are the same at all of the start point of a focus jump, the transit point(s) on the transit layer(s), and the focus landing point. However, in a focus jump across two or more recording layers, the optical disc drive may perform the focus jump if the data recording states are the same at all of the transit points on the transit layers. This method allows stable detection of the number of transit layers.

Alternatively, in a focus jump across two or more recording layers, the optical disc drive may perform the focus jump if the data recording states are the same at all of the transit points on the transit layers and the focus landing point. This method allows stable detection of the number of transit layers and stable focus landing at the focus target layer.

In the above-described embodiments, the threshold Va is set at a value to enable determination of passing of a recording layer regardless of whether data is recorded or not and the threshold Vb is set at a value to enable detection of a recording layer regardless of whether data is recorded or not. However, the values of the thresholds Va and Vb may be determined depending on the data recording state of a recording layer. In other words, the values of the thresholds Va and Vb may be determined depending on the level of the focus error signal or may be determined differently in each layer.

What is claimed is:

1. An optical disc drive for reading or writing information on a multilayer optical disc having three or more recording layers by irradiating the multilayer optical disc with a light beam, comprising:
   an optical pickup for irradiating the multilayer optical disc with the light beam;
   a recording state detector for detecting data recording states at a start point of a focus jump, a transit point or transit points on a recording layer or recording layers to be passed through, and an expected landing point of a focal point of the light beam in a focus jump to move the focal point of the light beam across one or more recording layers to a target recording layer; and
   a controller for moving the optical pickup to a position where the recording states are the same at all of the start point of the focus jump, the transit point or transit points on the recording layer or recording layers to be passed through, and the expected landing point of the focal point of the light beam if the recording states are different among the start point of the focus jump, the transit point or transit points on the recording layer or recording layers to be passed through, and the expected landing point of the focal point of the light beam, before starting the focus jump.

2. The optical disc drive according to claim 1, wherein the controller moves the optical pickup to a position where the recording states are the same at all of the start point of the focus jump, the transit point or transit points on the recording layer or recording layers to be passed through, and the expected landing point of the focal point of the light beam and which is located at a predetermined distance away from a boundary between an area with data recorded and an area without data recorded, before starting the focus jump.

3. The optical disc drive according to claim 1, wherein the controller starts the focus jump at a position where all of the start point of the focus jump, the transit point or transit points on the recording layer or recording layers to be passed through, and the expected landing point of the focal point of the light beam have no data recorded.

4. The optical disc drive according to claim 1, wherein the controller starts the focus jump at a position where all of the start point of the focus jump, the transit point or transit points on the recording layer or recording layers to be passed through, and the expected landing point of the focal point of the light beam have data recorded.

5. The optical disc drive according to claim 1, wherein, if at least any one of the start point of the focus jump, the transit point or transit points on the recording layer or recording layers to be passed through, and the expected landing point of the focal point of the light beam is located within a predetermined area from a boundary between an area with data recorded and an area without data recorded, the controller moves the optical pickup to a position where none of the start point of the focus jump, the transit point or transit points on the recording layer or recording layers to be passed through, and the expected landing point of the focal point of the light beam is located within the predetermined area from the boundary, before starting the focus jump.

6. A method of controlling an optical disc drive for reading or writing information on a multilayer optical disc having three or more recording layers by irradiating the multilayer optical disc with a light beam, comprising the steps of:

detecting data recording states at a start point of a focus jump, a transit point or transit points on a recording layer or recording layers to be passed through, and an expected landing point of a focal point of the light beam in a focus jump to move the focal point of the light beam across one or more recording layers to a target recording layer; and moving the optical pickup to a position where the recording states are the same at all of the start point of the focus jump, the transit point or transit points on the recording layer or recording layers to be passed through, and the expected landing point of the focal point of the light beam if the recording states are different among the start point of the focus jump, the transit point or transit points on the recording layer or recording layers to be passed through, and the expected landing point of the focal point of the light beam, before starting the focus jump.

\* \* \* \* \*